United States Patent
Huang et al.

(10) Patent No.: US 10,158,521 B2
(45) Date of Patent: Dec. 18, 2018

(54) TONE MAP SELECTING DEVICE AND METHOD

(71) Applicant: MStar Semiconductor, Inc., Hsinchu Hsien (TW)

(72) Inventors: Tzu-Hsuan Huang, Hsinchu Hsien (TW); Tai-Lai Tung, Hsinchu Hsien (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/435,564

(22) Filed: Feb. 17, 2017

(65) Prior Publication Data
US 2017/0324603 A1    Nov. 9, 2017

(30) Foreign Application Priority Data
May 3, 2016    (TW) .............................. 105113726 A

(51) Int. Cl.
   *H04L 27/34*     (2006.01)
   *H04B 3/54*      (2006.01)
   *H04L 12/26*    (2006.01)
   *H04L 5/00*      (2006.01)

(52) U.S. Cl.
CPC .......... *H04L 27/3405* (2013.01); *H04B 3/542* (2013.01); *H04L 43/16* (2013.01); *H04L 5/006* (2013.01)

(58) Field of Classification Search
CPC ... H04L 1/0026; H04L 5/0046; H04L 1/0003; H04L 5/006; H04L 5/0094; H04L 27/3405; H04L 43/16
See application file for complete search history.

(56) References Cited

U.S. PATENT DOCUMENTS

| | | | |
|---|---|---|---|
| 2005/0018784 A1* | 1/2005 | Kurobe | H04L 1/0003 375/260 |
| 2007/0109971 A1* | 5/2007 | Yoshida | H04B 3/54 370/236 |
| 2007/0115973 A1* | 5/2007 | Koga | H04B 3/54 370/389 |
| 2010/0100741 A1 | 4/2010 | Newman et al. | |
| 2014/0269873 A1* | 9/2014 | Tahir | H04W 52/241 375/227 |

FOREIGN PATENT DOCUMENTS

TW          201230740 A     7/2012

\* cited by examiner

*Primary Examiner* — David S Huang
(74) *Attorney, Agent, or Firm* — Edell, Shapiro & Finnan, LLC

(57) ABSTRACT

A tone map selecting device includes: a bit-number-per-symbol providing circuit, providing a plurality of bit numbers per symbol, each of which associated with a tone map; a calculating circuit, performing a predetermined calculation on the bit numbers per symbol to generate a calculation result; and a selecting circuit, identifying one of the bit numbers per symbol that satisfies a predetermined relationship with the calculation result, and selecting the tone map associated with the bit number per symbol satisfying the predetermined relationship as a default tone map.

14 Claims, 5 Drawing Sheets

TONE MAP SELECTING DEVICE AND METHOD

This application claims the benefit of Taiwan application Serial No. 105113726, filed May 3, 2016, the subject matter of which is incorporated herein by reference.

BACKGROUND OF THE INVENTION

Field of the Invention

The invention relates in general to a tone map selecting device and method, and more particularly to a tone map selecting device and method capable of selecting a tone map according to a bit number per symbol.

Description of the Related Art

In a power line communication (PLC) system, a signal receiver estimates the signal-to-noise ratio (SNR) of received signals in different time intervals and returns the estimated results to a signal transmitter, which is then allowed to accordingly select an appropriate signal carrier modulation scheme. That is, given that a target bit error rate (BER) is satisfied, the signal transmitter determines a signal carrier modulation scheme suitable for a time interval, and such determined result is referred to as a tone map.

In addition respective tone maps of the intervals, a default tone map may be used as a tone map of any interval. The default tone map is usually a tone map of an unusable interval that needs to be re-evaluated. Once a tone map of a certain interval is deemed invalid, the interval becomes the foregoing unusable interval that needs to be re-evaluated. At this point, the signal transmitter uses the unusable interval to transmit data according to the default tone map until the tone map of the unusable interval has been re-evaluated. Thus, the default tone map needs to immediately reflect channel conditions to prevent a high BER of the data transmitted.

There are three common approaches for selecting a tone map in known technologies—using a tone map of quadrature phase-shift keying (QPSK) as a default tone map, using a newly re-evaluated tone map as a default tone map, and always adopting an original default tone map. However, all of the three approaches suffer from drawbacks of not being able to reflect current channel conditions nor consider conditions of the intervals.

SUMMARY OF THE INVENTION

The invention is directed to a tone map selecting device, method and system to improve the prior art.

The present invention discloses a tone map selecting device. According to an embodiment of the present invention, the tone map selecting device includes: a bit-number-per-symbol providing circuit, providing a plurality of bit numbers per symbol, each of which associated with a tone map; a calculating circuit, performing a predetermined calculation on the plurality of bit numbers per symbol to generate a calculation result; and a selecting circuit, identifying one of the bit numbers per symbol that satisfies a predetermined relationship with the calculation result, and selecting the tone map associated with the bit number per symbol satisfying the predetermined relationship as a default tone map.

The present invention further discloses a tone map selecting method applied to a power line communication (PLC) system. According to an embodiment of the present invention, the method includes: obtaining a plurality of bit numbers per symbol, each of which associated with a tone map; performing a predetermined calculation on the bit numbers per symbol to generate a calculation result; identifying one of the bit numbers per symbol that satisfies a predetermined relationship with the calculation result, and selecting the tone map associated with the bit number per symbol satisfying the predetermined relationship as a default tone map.

The above and other aspects of the invention will become better understood with regard to the following detailed description of the preferred but non-limiting embodiments. The following description is made with reference to the accompanying drawings.

DETAILED DESCRIPTION OF THE INVENTION

The present invention discloses a tone map selecting device, method and system capable of flexibly determining a default tone map according to conditions of transmission intervals to improve data throughput.

Figure 1:
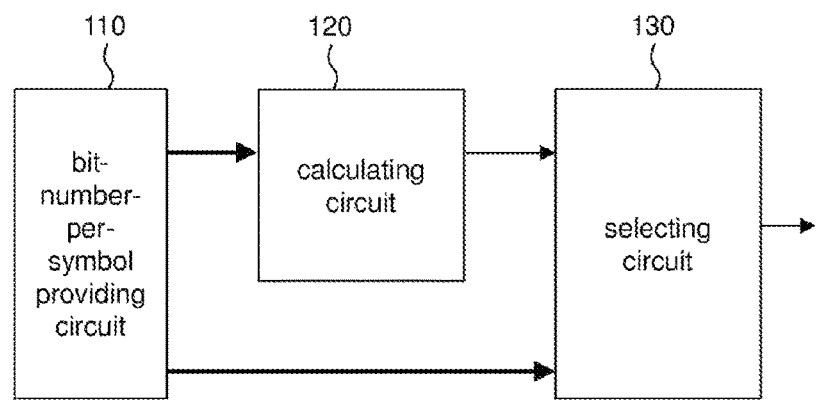
FIG. 1 is a schematic diagram of a tone map selecting device according to an embodiment of the present invention.

FIG. 1 shows a schematic diagram of a tone map selecting device according to an embodiment of the present invention. As shown in FIG. 1, the tone map selecting device 100 includes a bit-number-per-symbol providing circuit 110, a calculating circuit 120 and a selecting circuit 130. The bit-number-per-symbol providing circuit 110 provides a plurality of bit numbers per symbol, each of which associated with a valid tone map and a corresponding tone map index (TMI). It should be noted that, although the bit-number-per-symbol providing circuit 110 may provide a plurality of bit numbers per symbol, it does not mean that there are a plurality of bit numbers per symbol available to be provided at any given moment. More specifically, each tone map includes information of a signal carrier modulation scheme, and the corresponding bit number per symbol can be learned according to information of the signal carrier modulation scheme of the tone map. Thus, the bit-number-per-symbol providing circuit 110 may learn the respective bit numbers per symbol from the tone maps that a signal receiver obtains. The calculating circuit 120 performs a predetermined calculation on the plurality of bit numbers per symbol to generate a calculation result. The predetermined calculation may be, for example, a weighted calculation or other calculations defined by an implementer. The selecting circuit 130 identifies one of the bit numbers per symbol that satisfies a predetermined relationship with the calculation result (e.g., identifying one of the bit numbers per symbol that is closest to or closest to and not greater than the calculation result), and selects the valid tone map associated with the bit number per symbol satisfying the predetermined relationship as a default tone map, or selects the valid tone map associated with one of the bit numbers per symbol that satisfies a predetermined condition (e.g., the smallest bit number per symbol) as the default tone map.

In continuation, for example, the selecting circuit 130 may select one of the bit numbers per symbol that is closest to or closest to and not greater than the calculation result to satisfy the predetermined relationship, and selects the valid tone map associated with the identified bit number per symbol as the default tone map. By having the selecting circuit 130 select the bit number per symbol that is not greater than the calculation result prevents over-estimating the data throughput supported by the channel. However, the above condition is an example but not a limitation, and one person skilled in the art may define a condition as required. Further, the selecting circuit 130 may select the smallest of the plurality of bit numbers per symbol to satisfy the predetermined condition, and select the valid tone map associated with the selected bit number per symbol as the default tone map. By having the selecting circuit 130 select the smallest bit number per symbol ensures that signals are successfully transmitted when a fast transmission speed is not the top priority. To realize the above examples, FIG. 2 and FIG. 3 show block diagrams of the calculating circuit 120 and the selecting circuit 130 according to embodiments of the present invention, with associated details given as below.

Figure 2:
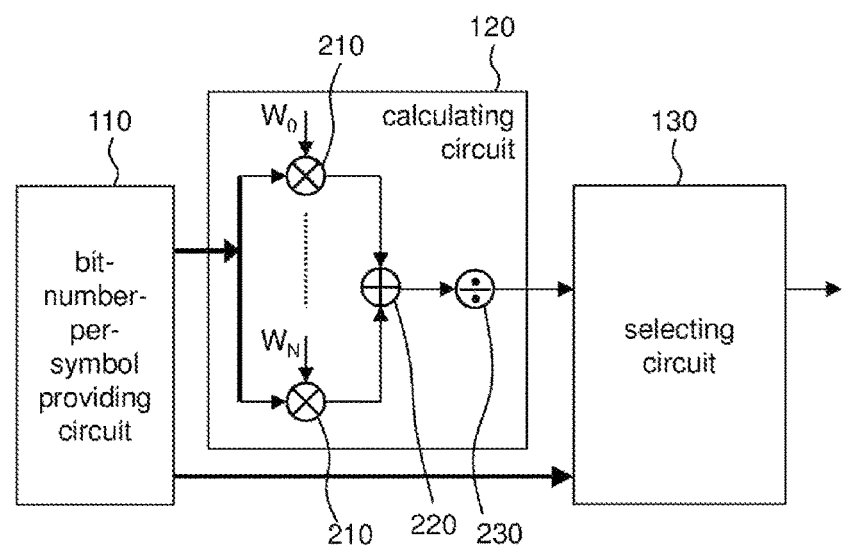
FIG. 2 is a schematic diagram of a calculating circuit in FIG. 1 according to an embodiment.
Figure 3:
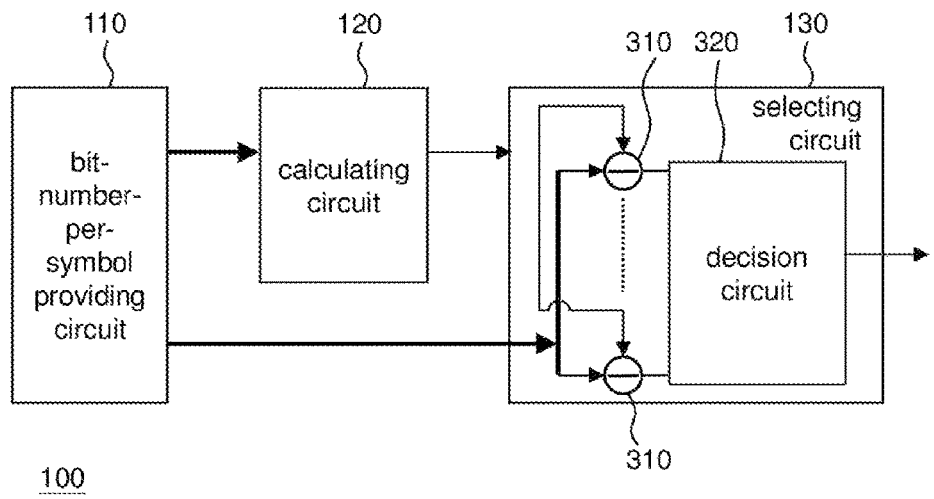
FIG. 3 is a schematic diagram of a selecting circuit in FIG. 1 according to an embodiment.

Referring to FIG. 2, the calculating circuit 120 includes: a plurality of multipliers 210, respectively generating a plurality of weighted values according to a plurality of weights ($W_0, \ldots, W_N$, where the subscript N is a positive integer) and the bit numbers per symbol; an adder, adding up the weighted values to generate a total value; and a divider 230, dividing the total value by a sum of the weights to obtain the calculation result. Referring to FIG. 3, the selecting circuit 130 includes: a plurality of subtractors 310, subtracting the calculation result from the bit numbers per symbol to obtain a plurality of subtraction values; and a decision circuit 320, identifying one of the bit numbers per symbol that is closest to or closet to and not greater than the calculation result to satisfy the predetermined relationship, or identifies the smallest of the bit numbers per symbol to satisfy the predetermined condition. One person having ordinary skill in the art can realize and/or modify the structures and connections of the bit-number-per-symbol providing circuit 120, the calculating circuit 120 and the selecting circuit 130 based on the disclosure and generally known technologies of the technical field, and such repeated details are omitted herein.

Figure 4:
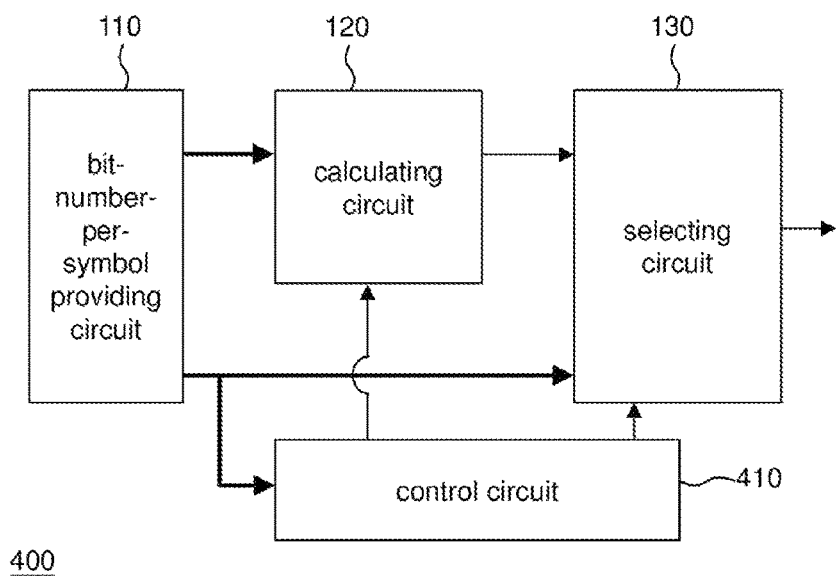
FIG. 4 is a schematic diagram of a tone map selecting device according to another embodiment of the present invention.

FIG. 4 shows a schematic diagram of a tone map selecting device according to another embodiment of the present invention. As shown in FIG. 4, the tone map selecting device 400 further includes a control circuit 410. The control circuit 410 controls the first calculating circuit 120 to perform a first weighted calculation on the plurality of bit numbers per symbol when a first condition is satisfied, and controls the calculating circuit 120 to perform a second weighted calculation on the plurality of bit numbers per symbol when a second condition is satisfied, to generate the calculation result. The first weighted calculation is different from the second weighted calculation, and the two may be realized through the control circuit 410 setting weights shown in FIG. 3. More specifically, the plurality of valid tone maps are included in a plurality of tone maps (the term "included" include "equal to" in the application), the first condition includes that, the plurality of tone maps include at least one new tone map (the at least one new tone map may be one of the valid tone maps). Because the new tone map is most capable of reflecting current channel conditions, the first weighted calculation allots a higher weight to the bit number per symbol associated with the new tone map while lower weights to the bit numbers per symbol associated with other valid tone maps, wherein the weights may be determined by an implementer as required. The second condition includes that, the plurality of tone maps include at least one invalid tone map, and the second weighted calculation allots weights in a decreasing order to the bit numbers per symbol according to a decreasing order of the plurality of bit numbers per symbol to obtain the calculation result (at this point, the second condition may include a BER being smaller than a predetermined value), or may allot weights in an increasing order to the bit numbers per symbol to obtain the calculation result (at this point, the second condition may include the BER being greater than a predetermined value).

Figure 5:
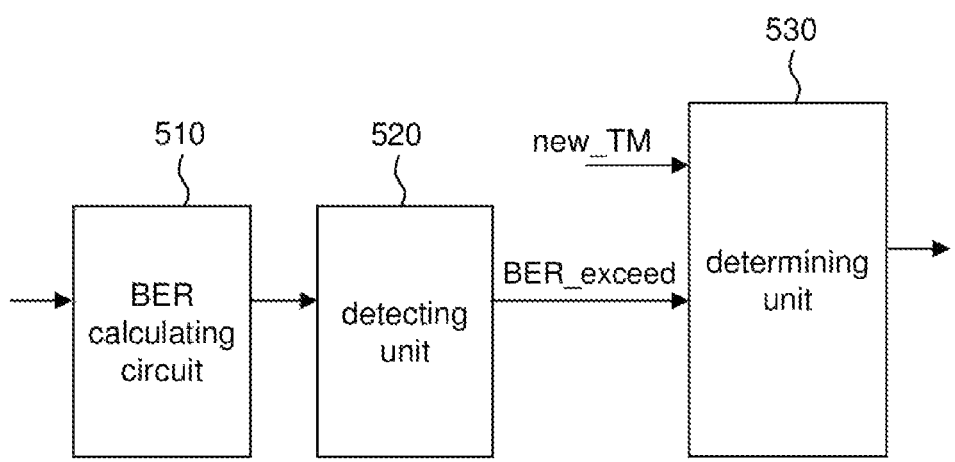
FIG. 5 is a schematic diagram of determining circuit that determines whether a tone map is valid according to an embodiment of the preset invention.

The determination for whether a tone map is valid may be realized by the determining circuit 500 in FIG. 5. The determining circuit 500 may be included in the control circuit 410 in FIG. 4, or may be an independent circuit. As shown in FIG. 5, the determining circuit 500 includes: a BER calculating unit 510, calculating a BER of data received in an interval corresponding to a tone map to generate a BER calculation result; a detecting unit 520, detecting whether the BER calculation result falls in a predetermined range according to at least one BER threshold (e.g., a high BER threshold and a low BER threshold) to generate a detection result, which corresponds to a first value when the BER calculation result falls in the predetermined range (meaning that the BER calculation result is acceptable) or corresponds to a second value; and a determining unit 530, outputting an indication result indicating whether the tone map is valid when the detection result corresponds to the first value, e.g., outputting a determination result indicating that the one map is valid when the detection result corresponds to the first value. The determining unit 530 may further output the determination result indicating that a tone map is valid when a new tone map indicator (denoted as new_TM) indicates that the tone map is a new tone map. The new tone map may be generated by a tone map estimator (not shown). How the tone map estimator estimates a tone map is generally known technology that shall not be discussed herein.

Referring to FIG. 4, in an alternative embodiment, the control circuit 410 controls the selecting circuit 130 to select the valid tone map associated with the bit number per symbol satisfying the predetermined relationship as the default tone map when the calculation result is greater than a threshold, and controls the selecting circuit 130 to select the valid tone map associated with one of the plurality of bit numbers per symbol (e.g., the smallest bit number per symbol) that satisfies the predetermined condition as the default tone map when the calculation result is smaller than the threshold. The comparison of the calculation result and the threshold may be realized by a comparator (not shown) included in the control circuit 410, and the value of the threshold may be determined by an implementer as required to prevent an extreme situation. For example, when the calculation result is too small, the selecting circuit 130 is controlled to directly select the valid tone map associated with the smallest of the plurality of bit numbers per symbol as the default tone map.

Again referring to FIG. 4, in an alternative embodiment, the control circuit 410 performs steps of: determining whether a valid tone map quantity satisfies a predetermined quantity (e.g., determining whether the valid tone map quantity is smaller than 2); selecting a predetermined tone map as the default tone map when the control circuit 410 determines that the valid tone map quantity satisfies the predetermined quantity (e.g., a tone map based on QPSK modulation is used as the default tone map when the control circuit 410 determines that the valid tone map quantity is equal to 0), or selecting a sole tone map as the default tone map (e.g., selecting the sole tone map as the default tone map when the control circuit 410 determines that the valid tone map quantity is equal to 1). The determination of the above quantity may be realized by a combination of the adder and comparator included in the control circuit 410 or an equivalent device.

Figure 6:
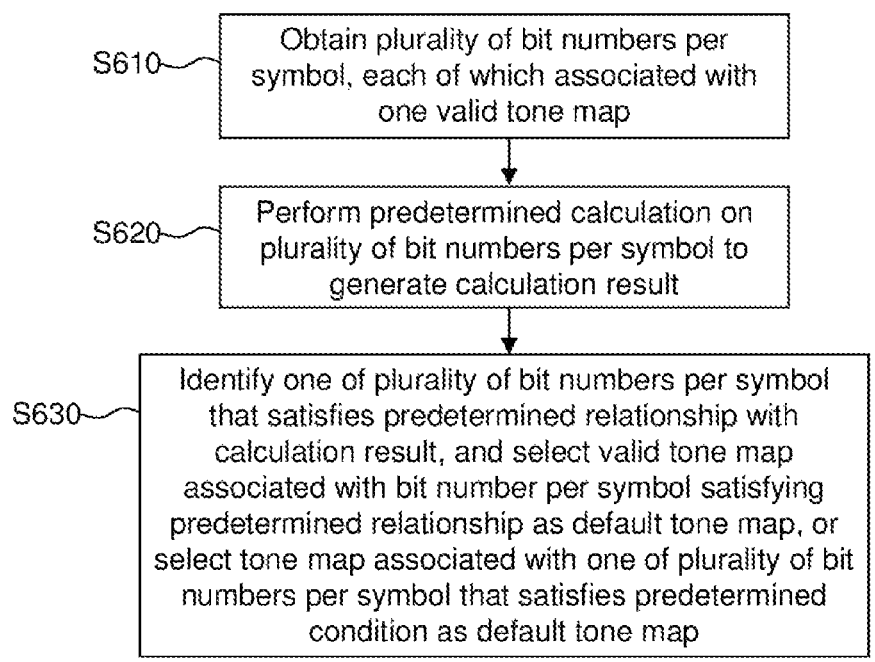
FIG. 6 is a flowchart of a tone map selecting method according to an embodiment of the present invention.

In addition to the foregoing device, the present invention further provides a tone map selecting method that may be performed by the tone map selecting device in FIG. 1. As shown in FIG. 6, the tone map selecting method according to an embodiment includes following steps.

In step S610, a plurality of bit numbers per symbol are obtained, wherein each of the bit numbers per symbol is associated with a valid tone map. Details and variations of this step may be learned or deduced from the description on the device in the foregoing embodiments.

In step S620, a predetermined calculation is performed on the plurality of bit numbers per symbol to generate a calculation result. Details and variations of this step may be learned or deduced from the description on the device in the foregoing embodiments.

In step S630, one of the plurality of bit numbers per symbol that satisfies a predetermined relationship with the calculation result is identified, and the valid tone map associated with the bit number per symbol satisfying the predetermined relationship is selected as a default tone map, or the valid tone map associated with one of the plurality of bit numbers per symbol that satisfies a predetermined condition is selected as the default tone map. Details and variations of this step may be learned or deduced from the description on the device in the foregoing embodiments.

According to an embodiment, the tone map selecting method may further include steps of: determining whether a valid tone map quantity satisfies a predetermined quantity; selecting a predetermined tone map as the default tone map when the valid tone map quantity satisfies the predetermined quantity, or selecting a sole tone map as the default tone map; and performing steps S610 to S630 when it is determined that the valid tone map quantity does not satisfy the predetermined quantity. Details and variations of this step may be learned or deduced from the description on the device in the foregoing embodiments.

One person skilled in the art can understand the implementation details and variations of the method of the invention based on the disclosure of the foregoing device of the invention; that is, the technical features of the foregoing device of the invention may be reasonably applied to the method of the invention. Therefore, without affecting full disclosure and possible implementation of the method of the present invention, repeated details are omitted herein.

Figure 7:
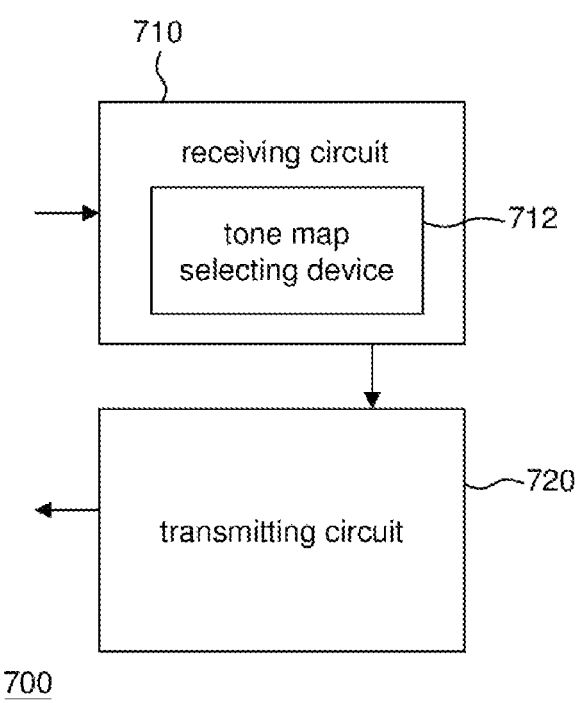
FIG. 7 is a schematic diagram of a tone map selecting system according to an embodiment of the present invention.

In addition to the foregoing device and method, the present invention further discloses a tone map selecting system, as shown in FIG. 7. Referring to FIG. 7, a tone map selecting system 700 according to an embodiment includes: a receiving circuit 710 and a transmitting circuit 720. The receiving circuit 710 receives data of a connected terminal, and includes a tone map selecting device 712, e.g., the tone map selecting device 100 in FIG. 1 or an equivalent device. The tone map selecting device 712 determines whether a new tone map condition (e.g., the first condition in the foregoing embodiment or a similar condition) or an invalid tone map condition (e.g., the second condition in the foregoing embodiment or a similar condition) is satisfied according to the data of the connected terminal, and selects a default tone map according to bit numbers per symbol of a plurality of valid tone maps when the new tone map condition or the invalid tone map condition is satisfied. For example, the transmitting circuit 720 is a transmitting circuit of generally known technology or designed by an implementer, and transmits information of the default tone map to the connected terminal.

In continuation, when the new tone map condition or the invalid tone map condition is satisfied, and the tone map selecting device 712 determines that a valid tone map quantity satisfies a predetermined quantity according to the data of the connected terminal, the tone map selecting device 712 selects a predetermined tone map as the default tone map, or selects a sole tone map as the default tone map. Details and variations of this step may be learned or deduced from the description on the device in the foregoing embodiments.

In conclusion, the tone map selecting device, method and system of the present invention are capable of flexibly determining a default tone map according to conditions of transmission intervals to reflect channel conditions and hence improve data throughput.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A tone map selecting device, comprising:
   a bit-number-per-symbol providing circuit, providing a plurality of bit numbers per symbol, each of which associated with a tone map;
   a calculating circuit, performing a predetermined calculation on the plurality of bit numbers per symbol to generate a calculation result; and
   a selecting circuit, identifying one of the plurality of bit numbers per symbol that satisfies a predetermined relationship with the calculation result, and selecting the tone map associated with the bit number per symbol satisfying the predetermined relationship as a default tone map.

2. The tone map selecting device according to claim 1, wherein the selecting circuit selects the tone map associated with the bit number per symbol that is closest to the calculation result as the default tone map.

3. The tone map selecting device according to claim 2, wherein the selecting circuit selects the tone map associated with the bit number per symbol that is closest to and not greater than the calculation result as the default tone map.

4. The tone map selecting device according to claim 1, further comprising:
   a control circuit, controlling the calculating circuit to perform a first weighted calculation on the plurality of bit numbers per symbol when a first condition is satisfied, and controlling the calculating circuit to perform a second weighted calculation on the plurality of bit numbers per symbol when a second condition is satisfied, to generate the calculation result.

5. The tone map selecting device according to claim 4, wherein the first condition comprises that the plurality of tone maps comprise at least one new tone map, and the second condition comprises that the plurality of tone maps comprise at least one invalid tone map.

6. The tone map selecting device according to claim 1, further comprising:
a control circuit, controlling the selecting circuit to select the tone map associated with the bit number per symbol satisfying the predetermined relationship as the default tone map when the calculation result is greater than a threshold; and controlling the selecting circuit to select the tone map associated with the one of the plurality of bit numbers per symbol that satisfies a predetermined condition as the default tone map when the calculation result is smaller than the threshold.

7. The tone map selecting device according to claim 1, further comprising:
a control circuit, performing steps of:
determining whether a valid tone map quantity satisfies a predetermined value; and
when the control circuit determines that the valid tone map quantity satisfies the predetermined value, selecting a predetermined tone map as the default tone map, or selecting a sole tone map as the default tone map.

8. A tone map selecting method, applied to a signal receiver of a power line communication (PLC) system, comprising:
obtaining a plurality of bit numbers per symbol, each of which associated with a tone map;
performing a predetermined calculation on the plurality of bit numbers per symbol to generate a calculation result; and
identifying one of the plurality of bit numbers per symbol that satisfies a predetermined relationship with the calculation result, and selecting the tone map associated with the bit number per symbol satisfying the predetermined relationship as a default tone map.

9. The tone map selecting method according to claim 8, wherein the step of selecting the default tone map comprises:
selecting the tone map associated with the bit number per symbol that is closest to the calculation result as the default tone map.

10. The tone map selecting method according to claim 9, wherein the step of selecting the default tone map comprises:
selecting the tone map associated with the bit number per symbol that is closest to and not greater than the calculation result as the default tone map.

11. The tone map selecting method according to claim 8, further comprising:
performing a first weighted calculation on the plurality of bit numbers per symbol when a first condition is satisfied to generate the calculation result; and
performing a second weighted calculation on the plurality of bit numbers per symbol when a second condition is satisfied to generate the calculation result.

12. The tone map selecting method according to claim 11, wherein the first condition comprises that the plurality of tone maps comprise at least one new tone map, and the second condition comprises that the plurality of tone maps comprise at least one invalid tone map.

13. The tone map selecting method according to claim 8, further comprising:
selecting the tone map associated with the bit number per symbol satisfying the predetermined relationship as the default tone map when the calculation result is greater than a threshold; and
selecting the tone map associated with the one of the plurality of bit numbers per symbol that satisfies a predetermined condition as the default tone map when the calculation result is smaller than the threshold.

14. A tone map selecting method, applied to a signal receiver of a power line communication (PLC) system, comprising:
determining whether a valid tone map quantity satisfies a predetermined value;
when it is determined that the valid tone map quantity satisfies the predetermined value, selecting a predetermined tone map as a default tone map, or selecting a sole tone map as the default tone map; and
when it is determined that the valid tone map quantity does not satisfy the predetermined value, performing the steps of:
obtaining a plurality of bit numbers per symbol, each of which associated with a tone map;
performing a predetermined calculation on the plurality of bit numbers per symbol to generate a calculation result; and
identifying one of the plurality of bit numbers per symbol that satisfies a predetermined relationship with the calculation result, and selecting the tone map associated with the bit number per symbol satisfying the predetermined relationship as a default tone map.

* * * * *